United States Patent
Lomnitz et al.

(10) Patent No.: US 8,279,813 B2
(45) Date of Patent: Oct. 2, 2012

(54) METHOD AND APPARATUS OF SUBCHANNELIZATION OF WIRELESS COMMUNICATION SYSTEM

(75) Inventors: Yuval Lomnitz, Herzlia (IL); Huaning Niu, Milpitas, CA (US); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1013 days.

(21) Appl. No.: 12/237,554

(22) Filed: Sep. 25, 2008

(65) Prior Publication Data

US 2010/0074347 A1     Mar. 25, 2010

(51) Int. Cl.
*H04W 4/00* (2009.01)
*H04B 7/216* (2006.01)
*H04W 72/00* (2009.01)

(52) U.S. Cl. ........ 370/329; 370/330; 370/335; 455/450; 455/509

(58) Field of Classification Search .................. None
See application file for complete search history.

(56) References Cited

U.S. PATENT DOCUMENTS

| | | | | | |
|---|---|---|---|---|---|
| 2010/0002615 | A1* | 1/2010 | Gupta | .................. | 370/311 |
| 2010/0009691 | A1* | 1/2010 | Choi et al. | .................. | 455/450 |
| 2010/0254342 | A1* | 10/2010 | Cho et al. | .................. | 370/330 |
| 2010/0331006 | A1* | 12/2010 | Cho et al. | .................. | 455/450 |
| 2011/0002309 | A1* | 1/2011 | Park et al. | .................. | 370/335 |
| 2011/0055652 | A1* | 3/2011 | Park | .................. | 714/748 |
| 2011/0134759 | A1* | 6/2011 | Kim et al. | .................. | 370/242 |
| 2011/0141990 | A1* | 6/2011 | Cho et al. | .................. | 370/329 |
| 2011/0211618 | A1* | 9/2011 | Oyman et al. | .................. | 375/211 |

OTHER PUBLICATIONS

Fwu, Jong-Kae (JK) et al. "Improve UL Subchannelization for IEEE 802.16m", Intel Corporation, Project IEEE 802.16 Broadband Wireless Access Working Group <http://ieee802.org/16>, IEEE C80216m_853, Jul. 14, 2008.

Lomnitz, Yuval et al. "UL Physical structure SDD Text Proposal", Intel Corporation, Project IEEE 802.16 Broadband Wireless Access Working Group <http://ieee802.org/16>, IEEE C802.16mUL_PHY-08_004, Jun. 9, 2008.

Ho, Chung-Lien et al. "DL and UL Pilot Structure for IEEE 802.16m", Intel Corporation, Project IEEE 802.16 Broadband Wireless Access Working Group <http://ieee802.org/16>, IEEE C802.16mDL_PHY_Pilot, Jun. 17, 2008.

Harel, Tom et al. "UL symbol structure design for 802.16m—hopping localized transmission to improve TX power", Intel Corporation, Project IEEE 802.16 Broadband Wireless Access Working Group <http://ieee802.org/16>, IEEE C802.16m-08/269rl, May 7, 2008.

Lomnitz, Yuval et al. "UL symbol design for 802.16m—title selection and pilot design", Intel Corporation, Project IEEE 802.16 Broadband Wireless Access Working Group <http://ieee802.org/16>, IEEE C802.16m-08/268rl, May 7, 2008.

(Continued)

*Primary Examiner* — Clemence Han
(74) *Attorney, Agent, or Firm* — Cool Patent, P.C.; Kenneth J. Cool

(57) ABSTRACT

A method and apparatus to transmit pilot subcarriers over uplink channels. The pilot subcarriers includes symbols which hierarchically structured. The symbol includes a first split of at least two fractional frequency reuse (FFR) groups, a second split of a fractional frequency reuse (FFR) group to a distributed resource group and localized resource group and a third split of said distributed resource group and localized resource group into plurality of subchannels.

30 Claims, 5 Drawing Sheets

OTHER PUBLICATIONS

Lomnitz, Yuval et al. "UL Symbol structure design for 802.16m—mixed network support." Intel Corporation, IEEE 802.16 Broadband Wireless Access Working Group <http://ieee802.org/16>, IEEE C802.16m-08/267rl, May 7, 2008.

Wang, Lai-Huei et al. "Pilot Design in High-mobility Zone for 802.16m", NTHU, Project IEEE 802.16 Broadband Wireless Access Working Group <http://ieee802.org/16>, IEEE C80216m-08/135r3, Mar. 19, 2008.

Lomnitz, Yuval et al. "Requirements, concept and design of uplink symbol structure for 802.16m", IEEE S802.16m-08/266, May 5, 2008, IEEE Session #55, Macau.

* cited by examiner 2 pattern B for 4 pilot streams 3 pattern C for ½ pilot streams with 6X6 tile 4 pattern D for 1/2 pilot streams with 18x3 hopping unit 3 pattern E for ½ pilot streams with 6X5 tile

METHOD AND APPARATUS OF SUBCHANNELIZATION OF WIRELESS COMMUNICATION SYSTEM

BACKGROUND OF THE INVENTION

In modern communication systems such as, for example wireless metropolitan area network (WMAN) e.g., WiMAX and/or cellular systems e.g., Long Term Evolution (LTE), advanced communication technologies may be used.

A WiMAX station which operates according to the Institute of Electrical and Electronics Engineers (IEEE) 802.16e/m standards may use Multiple Input, Multiple Output (MIMO) techniques to transmit pilot signals over the uplink (UL). The pilot signal may include plurality of resource units (RU). An UL Physical Resource Unit (PRU) is the basic physical unit for resource allocation. The PRU may include Psc consecutive subcarriers by Nsym consecutive Orthogonal Frequency Division Multiple Access (OFDMA) symbols.

The unit size of outer permutation in UL subcarrier to resource unit mapping is N PRUs. The outer permutation may support at least one granularity values, and/or multiple granularity values. As a consequence, it causes a performance trade-off between scheduling gain and diversity gain.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
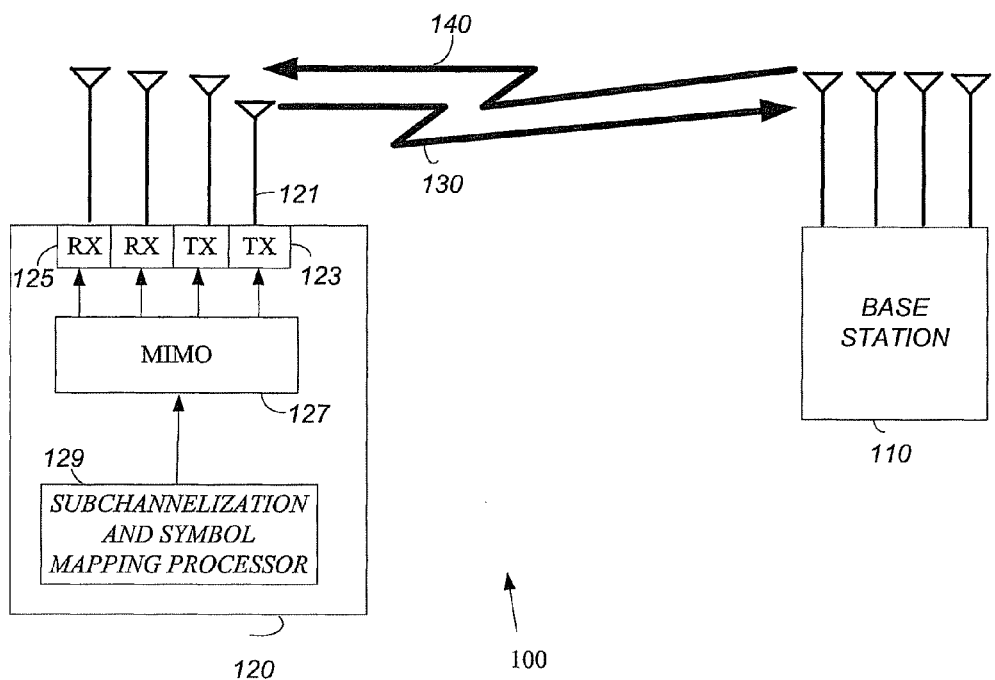
FIG. 1 is an illustration of a portion of communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals. These algorithmic descriptions and representations may be the techniques used by those skilled in the signal processing arts or/and in wireless communication arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer and/or computing system and/or medium access controller (MAC) and/or communication processor, or similar electronic computing device, that manipulate and/or transform data represented as physical, such as electronic, quantities within the computing system's registers and/or memories into other data similarly represented as physical quantities within the computing system's memories, registers or other such information storage, transmission or the like. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as communication devices of a radio system. The communication devices intended to be included within the scope of the present invention include, by way of example only, mobile stations, base stations and access points of radio systems such as, for example wireless local area network (WLAN), wireless metropolitan area network (WMAN) two-way radio transmitters, digital system transmitters, analog system transmitters, cellular radiotelephone transmitters, digital subscriber lines, LTE cellular systems and the like.

WMAN, LTE, WLAN mobile stations and/or base stations which intended to be within the scope of the present invention include, although are not limited to, may include transmitters and receivers for transmitting and receiving spread spectrum signals such as, for example, Frequency Hopping Spread Spectrum (FHSS), Direct Sequence Spread Spectrum (DSSS), and the like. The spread spectrum signals may be either in Frequency Division Multiplexing (FDM) (such as Orthogonal Frequency Division Multiplexing/Orthogonal Frequency-Division Multiple Access (OFDM/OFDMA) or in time division multiplexing (TDM) or in Code Division Multiple Access (CDMA), if desired.

Some embodiments of the invention may be implemented, for example, using a machine-readable medium or article which may store an instruction or a set of instructions that, if executed by a machine, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, assembly language, machine code, or the like.

In accordance with embodiments of the invention, a channel may be a physical transfer medium. The physical transfer medium may be used to transfer signals such as, for example, informative data signals, training signals, pilot signals, subcarriers signals, preamble signals and the like, that may be modulated by one or more modulation scheme. Furthermore, the channel may be a combination of the physical transfer medium, components of the transmitter and/or the receiver, for example path loss, noise, interference or the like. It should be understood to the skilled artisan that embodiments of the invention may operate with many types of signals, which partially mention above, and the invention is in no way limited to the above mentioned signals.

Turning to FIG. 1, a communication system such as, for example, a wireless metropolitan area network (WMAN) 100, in accordance with exemplary embodiment of the invention is shown. Although the scope of the present invention is not limited in this respect, IEEE standard 802.16 family may describe an air interface for broadband wireless access e.g., IEEE standard 802.16m 2008, that may be used with WMAN 100. WMAN 100 may include a base station 110, a mobile station 120, an uplink (UL) 130 and a downlink (DL) 140. UL 130 and DL 140 may include one or more channels.

Although the scope of the present invention is not limited in this respect, mobile station 120 may include one or more antennas, for example an antenna 121. In addition, mobile station 120 may includes two or more transmitters (TX) 123, two or more receivers (RX) 125, a MIMO controller 127 and a subchannelization and mapping processor 129.

Although the scope of the present invention is not limited in this respect, antenna 121 may include a dipole antenna, an omni-directional antenna, an internal antenna, a Yagi antenna, or the like.

According to embodiments of the invention, mobile station 120 may transmit over UL 130 signals which may include for example, data signal(s) and/or pilot subcarriers. The pilot subcarriers may be used for example, for enabling channel estimation, measurements of channel quality indicators such as, for example SINR, frequency offset estimation, and the like.

Subchannelization and mapping processor 129 may map a symbol to plurality of subcarriers (SC) and to the pilot subcarrier. MIMO controller 127 may map the subcarriers to TX 123, and antenna 121 may transmit the subcarriers over UL 130 to base station 110. Base station 120 may receive the data signal(s) and/or the pilot subcarriers and may transmit over DL 140, communications to mobile station 120. Mobile station 120 may receive the communications by antenna 121 and RX 125, although the scope of the present invention is not limited to this example.

Figure 2:
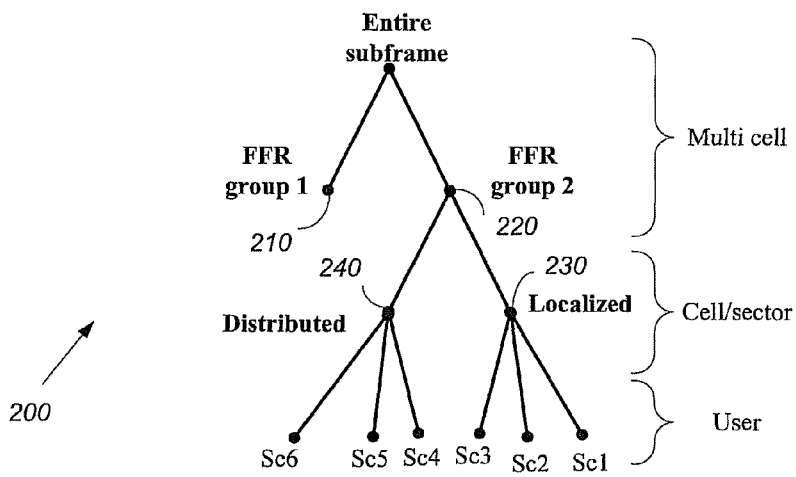
FIG. 2 is an illustration of a physical structure of an uplink 200 according to some exemplary embodiments of the invention.

Turning to FIG. 2, an illustration of a physical structure of an uplink e.g. uplink 130, according to some exemplary embodiments of the invention is shown. The uplink physical structure may support different resource allocation schemes simultaneously in the same subframe/zone. For example, contiguous (e.g., localized) and/or noncontiguous (e.g., distributed) physical resource units, if desired. For example, in order to support the different resources allocation schemes, a symbol 200 may split into first and second fractional frequency reuse (FFR) groups 210 and 220. FFR groups 210, 220 may split into localized and distributed resource groups 230 and 240. Localized and distributed resource groups 230 and 240 my split into individual subchannels e.g., Sc1, Sc2, Sc3, Sc4, Sc5 and Sc6. In other embodiments of the invention, localized and distributed resource groups 230 and 240 may split into resource units, although the scope of the present invention is not limited in this respect.

According to this exemplary embodiment, FFR groups 210, 220 may be determined by a multi cell decision. Localized and distributed resource groups 230 and 240 may be determined by a cell and/or a sector and the subchannels may be transmitted to/from different users, although the scope of the present invention is not limited to this example.

In embodiments of the invention, a physical resource unit (PRU) is the basic physical unit for resource allocation and may include Psc consecutive subcarriers by Nsym consecutive OFDMA symbols. For example, according to one embodiment, in a regular subframe, Nsym may include 6 OFDMA symbols. In another embodiment, an irregular subframe Psc may include 18 subcarriers and Nsym may include for example 5 and/or 7 OFDMA symbols, although the scope of the present invention is not limited to these examples.

A logical resource unit (LRU) is a basic logical unit for distributed and localized resource allocations, where a LRU is Psc*Nsym subcarriers. For example, LRU may include in its numerology the number of pilot subcarriers that are used in the PRU, and may include control information. Thus, an effective number of data subcarriers in the LRU may depend on the number of allocated pilots and control channel presence on the UL.

The distributed resource unit (DRU) may be used to achieve frequency diversity gain. The DRU may contain a group of subcarriers which are spread across the distributed resource allocations within the FFR group. For example, the size of the DRU may be substantially equal to the size of LRU for distributed allocations, if desired. The minimum unit for forming the UL DRU is a UL tile. For example, the UL tile sizes may be 6×6 for regular distributed allocation, 6×5 for irregular distributed allocation, 18×6 for UL transmit power optimized distributed allocation and 18×2 for irregular subframe, although the scope of the present invention is in no way limited to this example.

According to embodiments of the invention, the tiles within the distributed groups may be permuted ("inner permutation") across distributed group to maximize frequency diversity. As another example, the UL transmit power optimized distributed uses may be, for example 18×6 tile in distributed mode and/or localized mode to improve transmit power efficiency for UL power limited users, if desired.

In embodiments of the invention, a localized resource unit (LLRU) may be used to achieve frequency-selective scheduling gain. The LLRU may include a group of subcarriers which are contiguous across the localized resource allocations. For example, the size of the LLRU substantially equals the size of the PRU, and may be further depicted as Psc subcarriers by Nsym OFDMA symbols, although the scope of the present invention is not limited to this example.

According to some embodiments of the invention a basic symbol structure may be as follows: the subcarriers of an OFDMA symbol maybe partitioned into $N_{g,left}$ left guard subcarriers, $N_{g,right}$ right guard subcarriers, and $N_{used}$ used subcarriers. The Direct Current (DC) subcarrier is not loaded and zero values is applied. The $N_{used}$ subcarriers may be divided into PRUs. A PRU may include pilot and data subcarriers. The number of used pilot and data subcarriers depends on the type of resource allocation, i.e., distributed or localized resource allocations.

Figure 3:
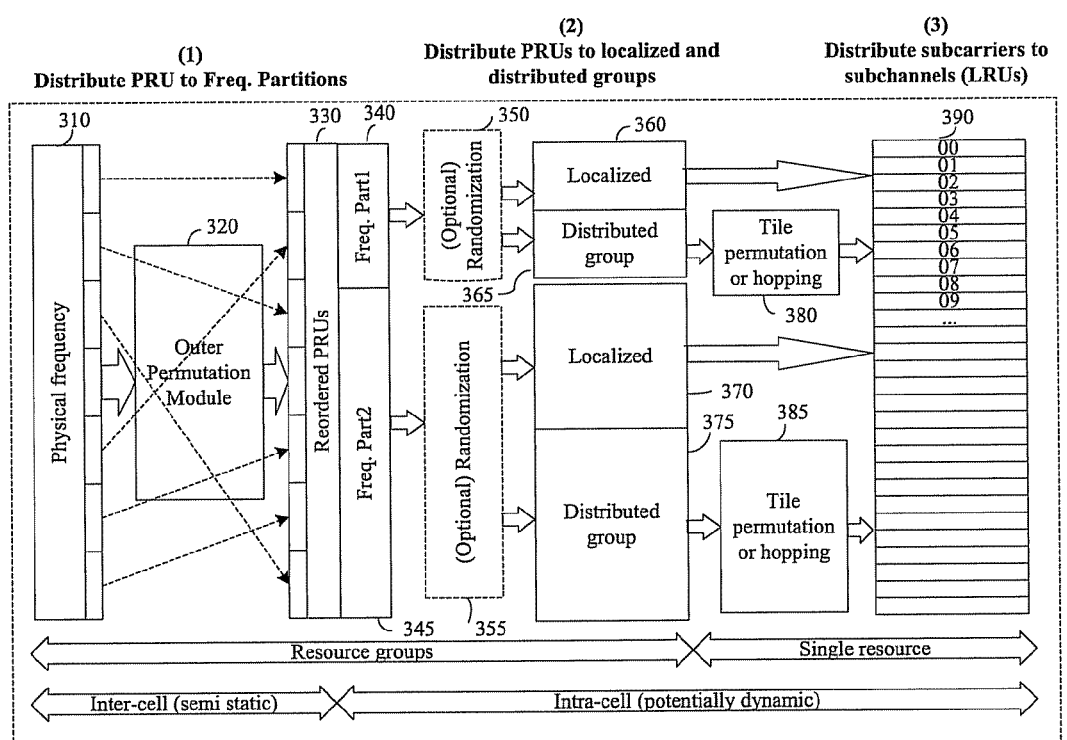
FIG. 3 is a block diagram of a subchannelization and a symbol mapping processor according to some embodiments of the invention.

Turning to FIG. 3 a block diagram of a subchannelization and a symbol mapping processor 300 according to some embodiments of the invention is shown. Although the scope of the present invention is not limited to this respect, symbol mapping processor 300 may include a physical frequency module 310, an outer permeation module 320, a reordered PRUs 330, first frequency part 340, second frequency part 345, a randomization module 350, a randomization module 355, a localized group 360, a distributed group 365, a localized group 370, a distributed group 375, a tile permutation or hopping module 380, a tile permutation or hopping module 385 and LRUs 390.

According to this exemplary embodiment, subchannelization and symbol mapping processor 300 may use three levels process to map the uplink subcarrier to resource unit and to subchannels. The first-level is distributing PRUs to frequency partitions. Physical frequency module 310 may provide PRUs to outer permutation module 320. Outer permutation module 320 may permutated recorded the PRUs. For example, the outer permutation is applied to the PRUs in the units of N PRUs, where N=4 and distributing the reordered PRUs 330 into frequency partitions 340 and 345.

The second level is distributing the PRUs to localized and distributed groups. According to one embodiment of the invention, the first and second frequency partition 340 and 345 may be divided into localized (LLRU) 360 and and/or distributed (DLRU) resources 365 using the PRU as the unit for each resource, if desired. The sizes of the groups may be flexibly configured per sector. For example, adjacent sectors may have different or same configuration of localized and diversity groups, although the scope of the present invention is not limited to this example.

According to one other embodiment of the invention, the first and second frequency partition 340 and 345 may be randomized by randomizations modules 350 and 355 and then distributed to localized (LLRU) 360, 370 and/or distributed (DLRU) resources 365, 375.

According to embodiments of the invention, the third level of the process is distributing the subcarriers to subchannels (LRUs). For example, localized groups 360 and 370 may mapped to LRUs 390 by direct mapping of LLRU and distributed groups 365 and 375 may be mapped by tile permutation or hopping modules 380 and 385 to LRUs 390, if desired According to some others embodiments of the invention, the first-level or outer permutation may be applied to the PRUs in the units of N1 and N2 PRUs, where N1=4 and N2=1. Outer permutation module 320 may provide a direct mapping of PRUs. This may allow a direct mapping of specific physical frequency bands to specific frequency partitions to enable deterministic inter-cell frequency planning.

According to this example, the frequency partition e.g., first frequency portion 340 and/or second frequency portion 345 may be divided into localized (LLRU) 360, 370 and/or distributed (DRU) 365, 375 resources for each resource. For example, the sizes of the distributed/localized resources may be flexibly configured per sector. Adjacent sectors have same or different configuration of localized and diversity resources.

A second-level permutation permutes PRUs within a frequency partition. According to this embodiment, localized resource 360, 370 may be directly mapped. The tile permutation defined for the uplink distributed resource allocations spreads the tiles of the DRU across the whole allocated frequency band. The granularity of the inner permutation may be equal to the minimum resource unit for forming a DRU.

According to some embodiments of the invention, two kinds of distributed resourced may be used for UL distributed subchannelization, the first kind of distributed resourced may be a regular distributed allocation and the second kind of distributed resourced may be an UL transmit power optimized distributed allocation. Power optimized distributed allocation may be supported by assigning contiguous localized subchannels which hop for predetermined number of symbols (e.g. 6 symbols). In some fields of the wireless communication art, power optimized distributed allocation may also termed as hopping localized.

According to one embodiment the UL transmit power optimized distributed allocation may be allocated first. The rest of the frequency resource may be distributed according to the regular distributed allocation. A second level hopping sequence may be defined for the power optimized allocation to spreads the hopping units across frequency band. The second-level or inner permutation defined for the UL regular distributed resource allocations spreads the tiles of the DRU across the frequency band. The granularity of the inner permutation may be equal to the tile size for forming a DRU. It should be understood by one skilled in the art that the order on different resources (e.g., distributed, localized, HL) permutation of the present invention is not limited to this example.

For example, the UL tile sizes may be 6×6 for regular distributed allocation (6×5 for irregular subframe) and 18×3 for UL transmit power optimized distributed allocation (18×2 for irregular subframe). According to this example from one to four subchannels may be allowed for each user in power optimized distributed allocations, although the scope of the present invention is not limited in this respect.

According to some exemplary embodiments of the present invention, localized subchannels may include plurality of subcarriers which are contiguous in frequency. Pilot subcarriers are used for localized subchannels and may be dedicated and are pre-coded/boosted in substantially the same way as data subcarriers.

Turning to FIGS. 4, 5, 6, 7 and 8 illustrations of different pilot stream patterns according to exemplary embodiments of the invention are shown. Different pilot stream patterns may be used for example, for channel estimation, measurements such as channel quality indicator (CQI), interference mitigation/cancellation, frequency offset estimation and time offset estimation (UL), if desired. The different pilot stream patterns may be dedicated to localized and distributed subchannels according to the desired communication system services. Different pilot stream patterns may be pre-coded, using the similar pre-coding and/or boosting of the information burst(s) when such pre-coding is applied.

According to some exemplary embodiments of the invention, five pilot stream patterns may be use to improve the efficiency and the performance of the wireless communication system, although the scope of the present invention is not limited to these five pilot stream patterns.

Figure 4:
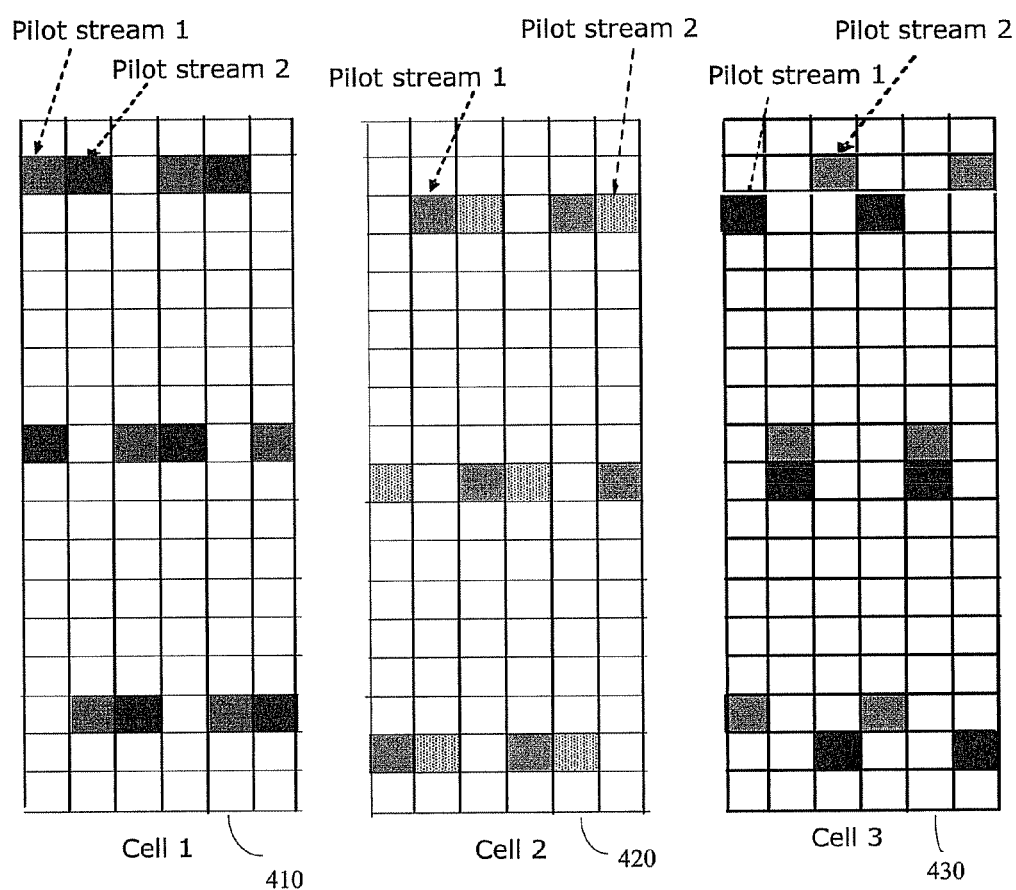
FIG. 4 is an illustration of a type A pilot stream patterns according to exemplary embodiments of the invention.

For example, FIG. 4 shows three illustrations of type A pilot stream patterns 410, 420 and 430 transmitted to three cells, according to exemplary embodiment of the invention. According to this example type A pattern includes 6 un-overlapped (interlaced) pilot patterns. On the UL different pilot pattern streams may be transmitted to different and/or the same cells by different users. On the DL the cell may select to transmit, simultaneously, different pilot pattern streams to different users, if desired. Type A pattern may be used with embodiments of the invention for transmitting first and second data streams for LLRU to a cell (e.g., cell 1, cell 2 and cell 3).

Figure 5:
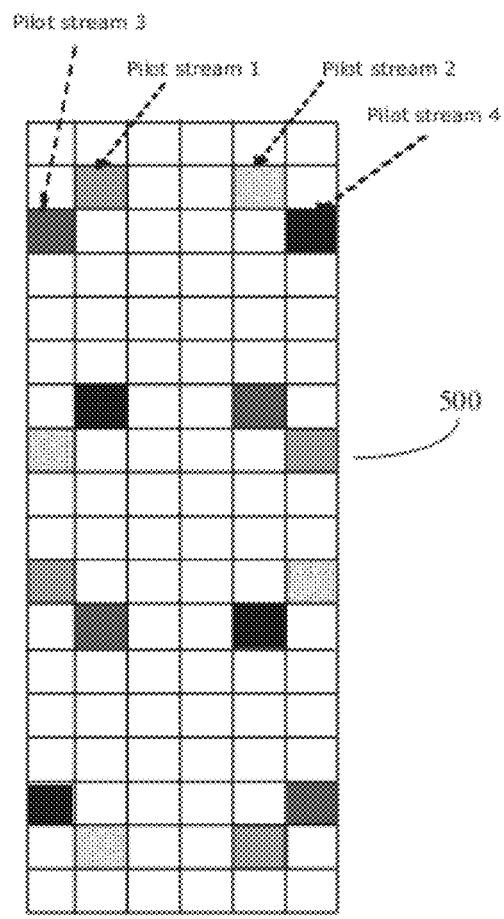
FIG. 5 is an illustration of a type B pilot stream patterns according to exemplary embodiments of the invention.

Different base stations or sectors may coordinate to choose different combinations of the pilot patterns for interlacing. For example, FIG. 5 shows an illustration of type B pilot pattern streams 500 that used for transmitting four data streams, according to another embodiment of the invention. Patterns A and B for LLRU may be substantially the same as downlink pilot patterns for the LLRU, although the scope of the present invention is not limited in this respect.

Figure 6:
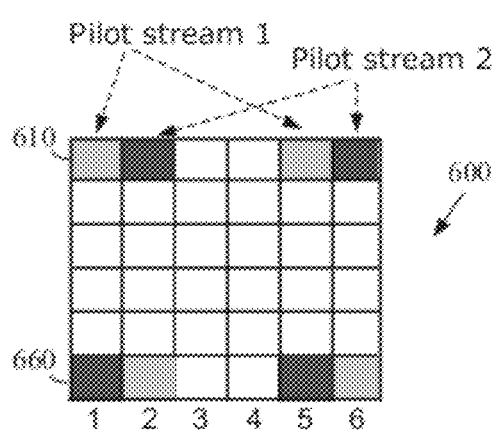
FIG. 6 is an illustration of a type C pilot stream patterns according to exemplary embodiments of the invention.
Figure 7:
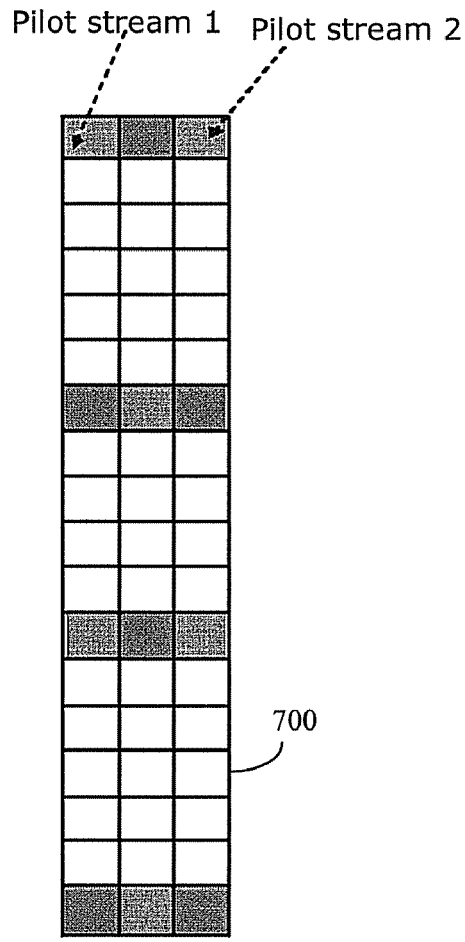
FIG. 7 is an illustration of a type D pilot stream patterns according to exemplary embodiments of the invention.
Figure 8:
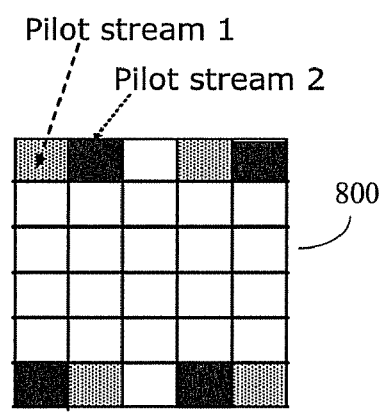
FIG. 8 is an illustration of a type E pilot stream patterns according to exemplary embodiments of the invention.

Yet, with other exemplary embodiments of the present invention, FIG. 6 shows a type C pilot stream pattern 600 which may be used for 6×6 DRU tile, FIG. 7 shows a type D pilot stream pattern 700 which may be used for 18×3 DRU hopping unit and FIG. 8 shows a type E pilot stream pattern 800 which may be used for 6×5 DRU tile. Type C pilot stream pattern 600 may include a tile size of six subcarriers by six symbols, wherein at least four pilot patterns of a first stream are located at a first subcarrier 610 in a first and fifth symbol (shown by the dotted line), and at a sixth subcarrier 660 in a second and a sixth symbol, and at least four pilot pattern of a second stream are located at the sixth subcarrier in the first and a fifth symbol, and the first subcarrier in a second and a sixth symbol (shown by the dotted line). Symbol locations at FIG. 6 are numbered from 1 to 6 and the subcarriers are the rows of the six by six table.

According to some embodiments, pilot boosting may be used to enhance the performance of channel estimation. The pilot boosting values may be defined as the pilot boosting power over average non-boosted data tones from each single stream. Boosting values for different pilot streams are listed in Table 1 below:

TABLE 1

| Pattern | N streams | Boost value |
| --- | --- | --- |
| A | 1 | 5.5 |
|   | 2 | 7.5 |
| B | 4 | 8.0 |
| C | 1 | 3.5 |
|   | 2 | 2.0 |
| D | 1 | 4.5 |
|   | 2 | 3.5 |
| E | 1 | 3.5 |
|   | 2 | 2.0 |

Although the scope of the present invention is not limited in this respect, The UL Physical Structure according to embodiments of the present invention may support legacy stations for example, legacy stations which operate according to IEEE 802.16e standard, if desired.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   transmitting over an uplink channel two or more symbols, wherein said symbol is hierarchically structured and includes a first split of at least one or more fractional frequency reuse (FFR) groups, a second split of at least one of the fractional frequency reuse (FFR) groups to a distributed resource group and a localized resource group and a third split of said distributed resource group and localized resource group into plurality of subchannels.

2. The method of claim 1, wherein the first split comprises:
   distributing a physical resource unit (PRU) to two or more frequency partitions.

3. The method of claim 2, further comprising:
   distributing said physical resource unit (PRU) to at least one of the localized groups and distributed groups.

4. The method of claim 1, wherein the first split comprises:
   allocating resources that substantially uniformly spread over a desired frequency bandwidth; and
   distributing the at least one or more fractional frequency reuse (FFR) groups.

5. The method of claim 1, wherein the first split comprises:
   distributing a plurality of subcarriers to the one or more fractional frequency reuse (FFR) groups; and
   distributing two or more pilot subcarriers of the plurality of subcarriers to the one or more fractional frequency reuse (FFR) groups, separately.

6. The method of claim 1, wherein the third split comprises:
   distributing two or more subcarriers to two or more of the subchannels.

7. The method of claim 1 comprising:
   transmitting a predetermined type of pilot stream pattern, wherein the predetermined type of pilot stream pattern is selected from a predetermined number of interlaced pilot patterns.

8. The method of claim 1 comprising,
   transmitting using multiple input multiple output transmitting techniques.

9. An apparatus comprising:
   subchannelization and symbol mapping processor to perform symbol mapping to map two or more uplink subcarriers to a resource unit and to two or more subchannels.

10. The apparatus of claim 9, wherein the subchannelization and symbol mapping processor is configured to apply at least three level of processing for said symbol mapping and a first level of the three level processing includes distributing a physical resources unit to first and second frequency partitions.

11. The apparatus of claim 10, wherein a second level comprises:
    dividing the first and second frequency partition to localized resource unit and to distributed resource unit.

12. The apparatus of claim 10, wherein a third level comprises:
    mapping two or more logical resource units to two or more of the two or more subchannels.

13. A wireless communication device comprising:
    subchannelization and symbol mapping processor to perform symbol mapping to map two or more uplink subcarriers to a resource unit and to two or more subchannels; and
    a transmitter to transmit the two or more subchannels.

14. The wireless communication device of claim 13, wherein the subchannelization and symbol mapping processor is configured to apply at least three level of processing for said symbol mapping and a first level of the three level processing includes distributing a physical resources unit to first and second frequency partitions.

15. The wireless communication device of claim 14, wherein a second level comprises:
    dividing the first and second frequency partition to localized resource unit and to distributed resource unit.

16. The wireless communication device of claim 14, wherein a third level comprises:
   mapping two or more logical resource units to two or more of the two or more subchannels.

17. The wireless communication device of claim 13, comprising:
   a multiple input multiple output controller to distribute a predetermined type of pilot stream patterns to the transmitter.

18. The wireless communication device of claim 17, wherein the predetermined type of pilot stream patterns comprises a predetermine number of interlaced pilot patterns.

19. A wireless communication device comprising:
   subchannelization and symbol mapping processor to perform symbol mapping to map two or more uplink subcarriers to a resource unit and to two or more subchannels; and
   a transmitter operably coupled to a dipole antenna to transmit the two or more subchannels.

20. The wireless communication device of claim 19, wherein the subchannelization and symbol mapping processor is configured to apply at least three level of processing for said symbol mapping and a first level of the three level processing includes distributing a physical resources unit to first and second frequency partitions.

21. The wireless communication device of claim 20, wherein a second level comprises:
   dividing the first and second frequency partition to localized resource unit and to distributed resource unit.

22. The wireless communication device of claim 20, wherein a third level comprises:
   mapping two or more logical resource units to two or more of the two or more subchannels.

23. The wireless communication device of claim 19, comprising:
   a multiple input multiple output controller to distribute a predetermined type of pilot stream patterns to the transmitter.

24. A wireless communication system comprising:
   a wireless communication device including a subchannelization and symbol mapping processor to perform symbol mapping to map two or more uplink subcarriers to a resource unit and to two or more subchannels; and
   a transmitter to transmit the two or more subchannels to a one or more cells.

25. The wireless communication system of claim 24, wherein the subchannelization and symbol mapping processor is configured to apply at least three level of processing for said symbol mapping and a first level of the three level processing includes distributing a physical resources unit to first and second frequency partitions.

26. The wireless communication system of claim 25, wherein a second level comprises:
   dividing the first and second frequency partition to localized resource unit and to distributed resource unit.

27. The wireless communication system of claim 25, wherein a third level comprises:
   mapping two or more logical resource units to two or more of the two or more subchannels.

28. The wireless communication system of claim 24, comprising:
   a multiple input multiple output controller to distribute a predetermined type of pilot stream patterns to the transmitter.

29. The wireless communication system of claim 28, wherein the predetermined type of pilot stream patterns comprises a selected pilot pattern which selected from a predetermine number of interlaced pilot patterns based on the one or more cells.

30. The wireless communication system of claim 28, wherein the predetermined type of pilot stream patterns comprises:
   a tile size of six subcarriers by six symbols, wherein at least four pilot patterns of a first stream are located at a first subcarrier in a first and fifth symbol, and at a sixth subcarrier in a second and a sixth symbol, and at least four pilot pattern of a second stream are located at the sixth subcarrier in the first and a fifth symbol, and the first subcarrier in a second and a sixth symbol.

* * * * *

UNITED STATES PATENT AND TRADEMARK OFFICE
CERTIFICATE OF CORRECTION

PATENT NO.        : 8,279,813 B2
APPLICATION NO.   : 12/237554
DATED             : October 2, 2012
INVENTOR(S)       : Yuval Lomnitz et al.

It is certified that error appears in the above-identified patent and that said Letters Patent is hereby corrected as shown below:

On the cover page, item (75), in column 1, in "Inventors", line 1, delete "Herzlia (IL);" and insert -- Herzliya (IL); --, therefor.

Signed and Sealed this
Twenty-seventh Day of November, 2012

David J. Kappos
*Director of the United States Patent and Trademark Office*